(12) United States Patent
Hosaka

(10) Patent No.: US 6,392,182 B1
(45) Date of Patent: May 21, 2002

(54) MACHINE TANK FOR ELECTRIC DISCHARGE MACHINE

(75) Inventor: Akio Hosaka, Sakai-Gun (JP)

(73) Assignee: Sodick Co., Ltd., Kanagawa (JP)

( * ) Notice: Subject to any disclaimer, the term of this patent is extended or adjusted under 35 U.S.C. 154(b) by 0 days.

(21) Appl. No.: 09/857,946

(22) PCT Filed: Oct. 12, 2000

(86) PCT No.: PCT/JP00/07094

§ 371 Date: Oct. 1, 2001

§ 102(e) Date: Oct. 1, 2001

(87) PCT Pub. No.: WO01/26858

PCT Pub. Date: Apr. 19, 2001

(30) Foreign Application Priority Data

Oct. 12, 1999 (JP) ............................................. 11-290240

(51) Int. Cl.$^7$ ................................................ B23H 1/00
(52) U.S. Cl. .................................. 219/69.11; 219/69.14
(58) Field of Search .......................... 219/69.11, 69.14; 204/224 M; 205/640, 650

(56) References Cited

U.S. PATENT DOCUMENTS

| 3,961,817 A | * | 6/1976 | Schrimsher | |
|---|---|---|---|---|
| 4,391,220 A | * | 7/1983 | Kent | |
| 4,462,532 A | * | 7/1984 | Davis, Jr. et al. | |
| 5,270,512 A | | 12/1993 | Onandia | 219/69.11 |
| 5,455,400 A | | 10/1995 | Bommeli et al. | 219/69.11 |
| 5,795,449 A | | 8/1998 | Sasaki | 219/69.14 |

FOREIGN PATENT DOCUMENTS

| JP | 08-071850 | 3/1996 |
|---|---|---|
| JP | 08-155740 | 6/1996 |
| JP | 09-285916 | 4/1997 |
| JP | 2968814 | 8/1999 |

* cited by examiner

Primary Examiner—Geoffrey S. Evans
(74) Attorney, Agent, or Firm—McDermott, Will & Emery; Paul Devinsky

(57) ABSTRACT

A work tank (20) for an electric discharge machine includes a tank wall (21) having an opening in a front surface and surrounding a workpiece; a front door (31) horizontally movable between an unlock position, where the front door is vertically movable, and a lock position, where the opening is closed in a generally liquid-tight relationship; a pair of brackets (32) attached to both sides of the front door and extending rearwardly; a handle lever (51) capable of pivoting about a fulcrum (35) and supported on at least one of the brackets; and a cam follower, fixed to the handle lever further forward than the pivot, the cam follower being vertically movable between a first position (H1) higher than the fulcrum and a second position (H2) lower than the fulcrum. The cam follower is fitted loosely into a groove (62) extending vertically and formed in a rail block (61). Horizontal movement of the cam follower is restricted. When the cam follower is at the first position, the front door is in the unlock position and is vertically movable. When the cam follower is at the second position, the front door is in the lock position and is held closed within the opening in a generally liquid-tight relationship.

12 Claims, 5 Drawing Sheets

MACHINE TANK FOR ELECTRIC DISCHARGE MACHINE

FIELD OF THE INVENTION

The present invention relates to an electric discharge machine for generating electric discharges in a working gap formed between a tool electrode and a workpiece while supplying dielectric fluid to the working gap. More particularly, the present invention relates to a work tank for storing dielectric fluid in which a workpiece has been immersed, or gathering dielectric fluid which, after being jetted at the working gap, is scattered away.

DESCRIPTION OF THE RELATED ART

Generally, a workpiece is positioned inside a work tank, and the work tank is filled with dielectric fluid such as kerosene or water with high electrical resistivity. A tool electrode is positioned extremely close to the workpiece. When a power pulse is applied across the workpiece and the tool electrode, the insulation characteristics of the dielectric fluid in the work gap are broken down and an electric discharge is produced. Microscopic amounts of the workpiece material are evaporated or molten by the heat caused by this electric discharge, and washed into the dielectric fluid. In order to restore the insulation characteristics of the dielectric in the working gap, application of the power pulse is stopped for a fixed time. During electric discharge machining, the breakdown and restoration of the insulation characteristics of the dielectric fluid is repeated cyclically. In addition to its function as an insulator, the dielectric fluid also functions to wash away scraps of the workpiece material, and to cool the working gap. Electric discharge machining methods have been used in which dielectric fluid is jetted into the work gap using an appropriate nozzle without storing the dielectric fluid in a work tank. With this type of electric discharge machining method, in order to save dielectric fluid, a work tank enclosing the workpiece is used to catch and gather any dielectric fluid which scatters from the working gap.

At least the front part of the work tank is movable so that in preparation for machining an operator can easily get close to the workpiece or tool electrode inside the work tank. For example, a work tank having a front door which is hinged on one side and can turn horizontally, is known. This type of work tank requires a large space when opening the front door. Japanese Laid-open Patent 8-71850 discloses a work tank having a front door capable of being folded in half from top to bottom. The work tank disclosed in this publication makes the space required to open the front door smaller.

DISCLOSURE OF THE INVENTION

An object of the present invention is to provide a work tank for an electric discharge machine that can rapidly perform continuous closing and locking of a front door.

Another object of the present invention is to provide a work tank for an electric discharge machine that can rapidly perform continuous unlocking and opening of a front door.

Yet another object of the present invention is to provide a work tank for an electric discharge machine that does not require a large space when opening a front door.

According to the present invention, a work tank for an electric discharge machine in which dielectric fluid is supplied between a workpiece and a tool electrode comprises a tank wall having an opening on a front side and surrounding a workpiece, a front door horizontally movable between an unlock position where the front door is vertically movable, and a lock position where the opening is closed in a generally liquid-tight relationship, a pair of brackets attached to both sides of the front door and extending rearward, a handle lever supported on at least one of the pair of brackets so as to pivot about the fulcrum, a cam follower, fixed to the handle lever further forward than the fulcrum, and being vertically movable between a first position higher up than the fulcrum and a second position lower down than the fulcrum, and a movement restricting member for restricting horizontal movement of the cam follower.

When the cam follower is at the first position, the front door is in the unlock position and is vertically movable. When the cam follower is at the second position, the front door is in the lock position and the opening is held closed in generally liquid-tight relationship.

Preferably, the handle levers are supported on each of the pair of brackets, and a handle is provided for connecting respective tips of the handle levers.

The movement restriction member is preferably a rail block having a vertically extending groove into which the cam follower is loosely fitted.

Preferably, a guide block, having a guide groove extending vertically and then extending rearward from the upper end, is attached to the tank wall, and a guide pin that can be fitted into the guide groove is provided on the bracket.

It is also preferable to provide stopper pins on the bracket, for restricting the pivoting angle of the handle lever by contacting the handle lever.

Other objects and novel features of the present invention will become clear upon reference to the following description.

DETAILED DESCRIPTION OF THE PREFERRED EMBODIMENTS

A work tank for an electric discharge machine, of the present invention, will now be described with reference to FIG. 1, FIG. 2, FIG. 3, FIG. 4, FIG. 5, FIG. 6 and FIG. 7.

Figure 1:
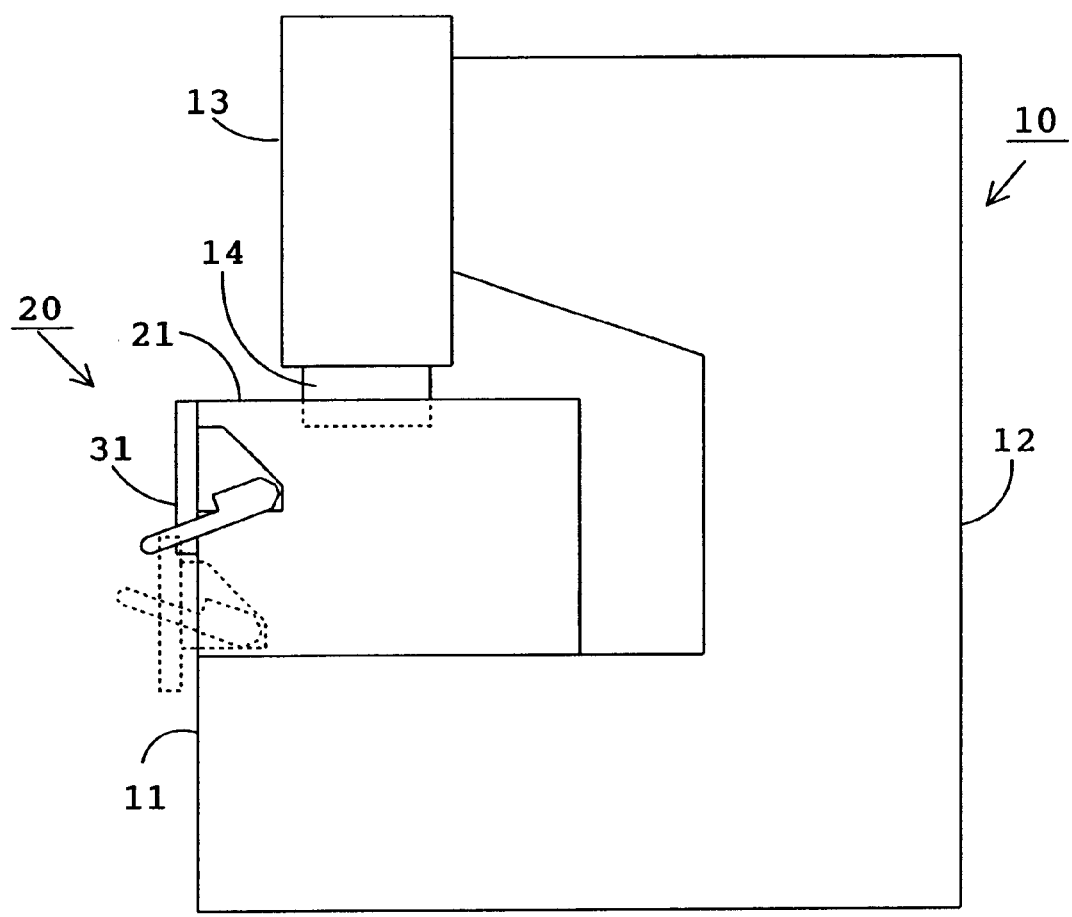
FIG. 1 is a side elevation illustrating an electric discharge machine adopting the work tank of the present invention.
Figure 2:
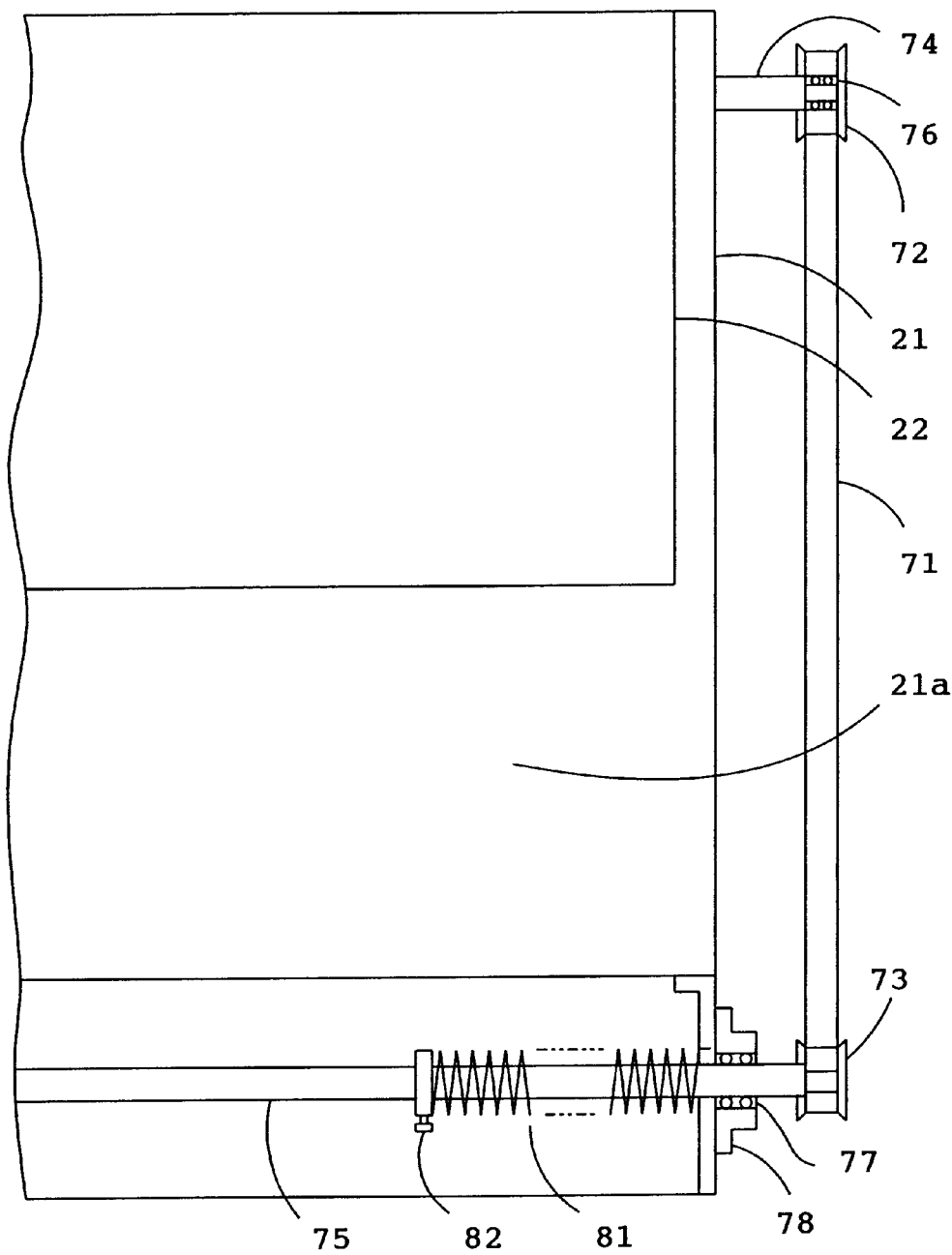
FIG. 2 is a front elevation partially illustrating the work tank of FIG. 1.
Figure 3:
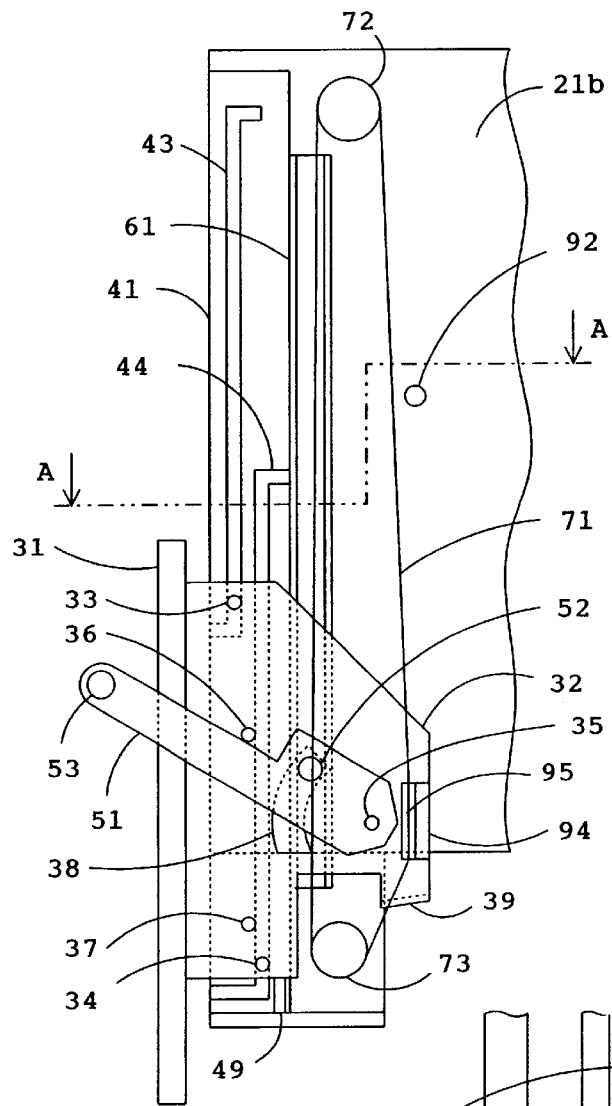
FIG. 3 is a side elevation partially illustrating the work tank of FIG. 1, when the front door is positioned at the lower limit.

As shown in FIG. 1, a work tank 20 of the present invention is mounted on a bed 12, and a workpiece (not shown in the drawing) is fixed to a table (not shown) provided at the bottom of the work tank 20. A head 13 is attached to a front surface of a column 12 so as to move vertically, and an electrode holder 14 is attached to a lower end of the head 13. The work tank 20 includes generally four-sided tank wall 21 enclosing the workpiece, and as shown in FIG. 2 an opening 22 is formed in the front wall 21*a*. Using the opening 22, an operator can easily get close to the workpiece or tool electrode inside the work tank 20. A front door 31 is provided in order to close the opening 22 in a generally liquid-tight relationship. Elastic packing is attached to the front wall 21*a* along the edge of the opening 22. The packing prevents leakage of dielectric fluid from a gap between the front wall 21*a* and the front door 31 when the door 31 is closed. The packing may be attached to the front door 31. As shown in FIG. 3, brackets 32 are attached to both ends of the front door 31, and extend rearward, generally parallel to the side wall 21*b*. In order to make it easy to replace the elastic packing, the brackets 32 may be detachable from the front door 31. Upper guide pins 33 and lower guide pins 34 are embedded in the brackets 32. Guide blocks 41, preferably made from engineering plastic having excellent abrasion resistance and low friction resistance, are attached to the side wall 21*b*. Guide grooves 43 and 44, into which the upper and lower guide pins 33 and 34 can be respectively fitted, are formed in the guide blocks 41. The upper and lower guide grooves 43 and 44 extend generally vertically, and then extend generally horizontally rearward from their upper ends. If the brackets 32, guided in the vertical part of the guide grooves 43 and 44, are moved vertically from the lower limit position shown in FIG. 3 to the upper limit position shown in FIG. 5, the front door 31 closes the opening 22 in the front wall 21*a*. Also, if the brackets 32, guided in the horizontal part of the guide grooves 43 and 44, are moved vertically from the position shown in FIG. 5 to the position shown in FIG. 6, the front door 31 closes the opening 22 in a generally liquid-tight relationship.

End stoppers 49 for determining the lower limit position of the brackets 32 are provided, preferably close to the lower end of the guide blocks 41. Fulcrum pins 35, extending generally parallel to the front wall 31, are attached to respective rear parts of the brackets 32. Handle levers 51 are supported on the respective brackets 32 so as to pivot about the fulcrum pins 35. A handle 53 is connected to respective tip ends of the handle levers 51. The handle 53 is positioned further forward than the front door 31. An operator may move the front door 31 using this handle 53. Stopper pins 36 and 37 for restricting the pivot angle of the handle levers 51 are embedded in the brackets 32, further forward than the fulcrum pins 35.

Figure 5:
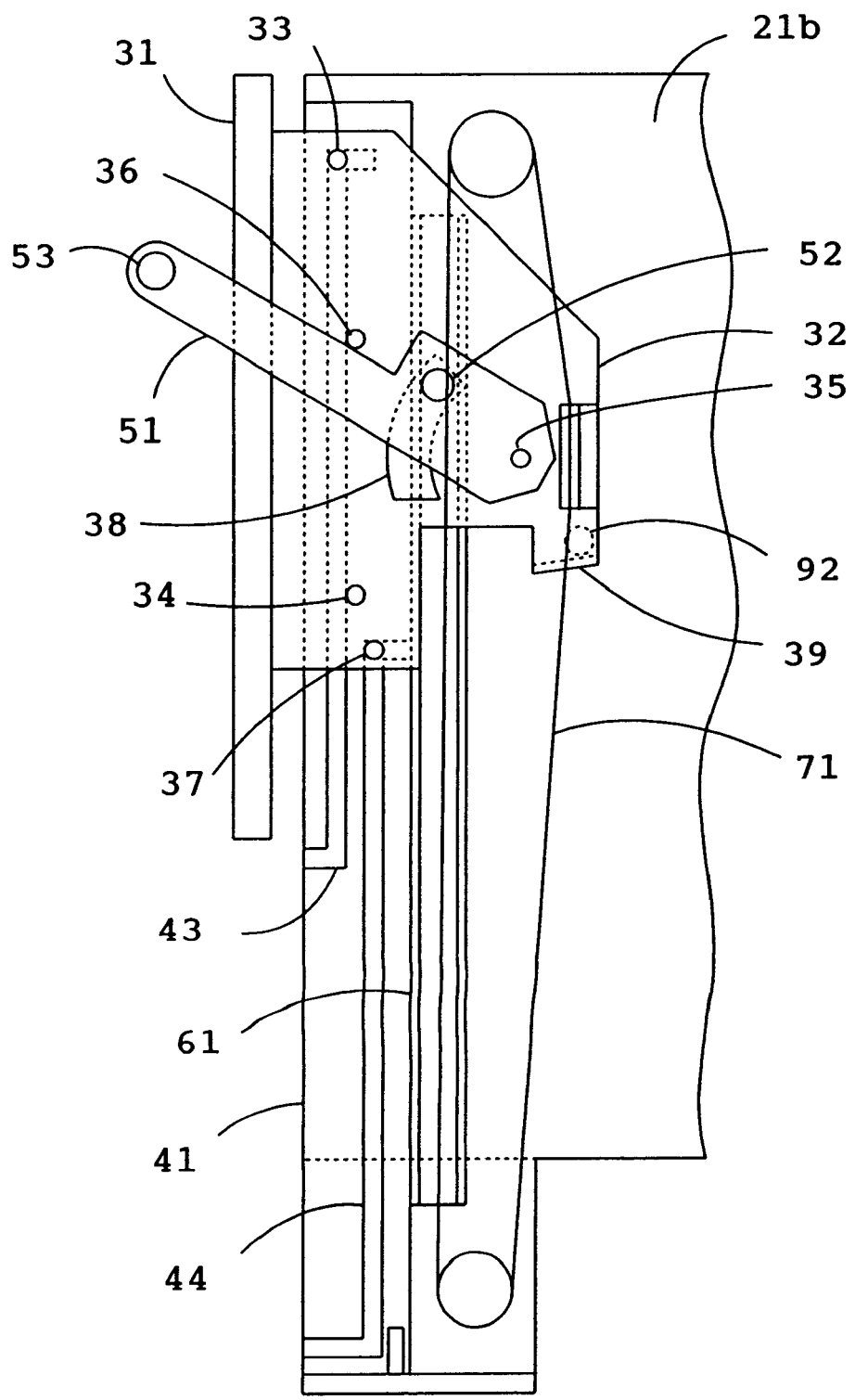
FIG. 5 is a side elevation partially illustrating the work tank of FIG. 1, when the front door is not locked at the upper limit 5 position.

As best seen in FIG. 3 and FIG. 5, when the handle levers 51 are in contact with the upper stopper pins 36, a line extending generally upwards from the fulcrum pins 35 to the handle 53 slopes up at about 27 degrees with respect to the horizontal.

Figure 6:
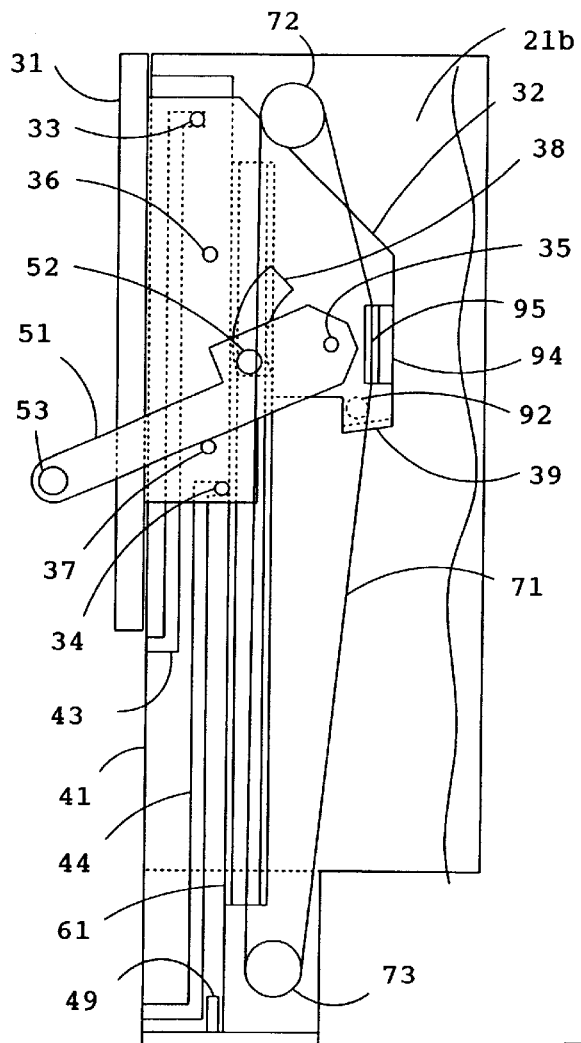
FIG. 6 is a side elevation partially illustrating the work tank of FIG. 1, when the front door is locked at the upper limit position.

As shown in FIG. 6, when the handle levers 51 are in contact with the lower stopper pins 37, a line extending generally downwards from the fulcrum pin 35 to the handle 53 slopes down at 27 degrees with respect to the horizontal. Lower ends of the rear sections of the brackets 32 are bent, and form respective engagement sections 38.

As best seen in FIG. 5, when the front door 31 is at the upper limit position, the engagement sections 38 are brought into contact with contact members 92 attached to the side wall 21*b*. The engagement sections 38 and the contact members 92 prevent the front door 31 falling forward. Cam followers 52 are attached to the handle levers 51 between the fulcrum pins 35 and the handle 53. Rail blocks 61 having a vertically extending groove 62 formed therein are attached to the side wall 21*b* closely behind the guide blocks 41.

Figure 4:
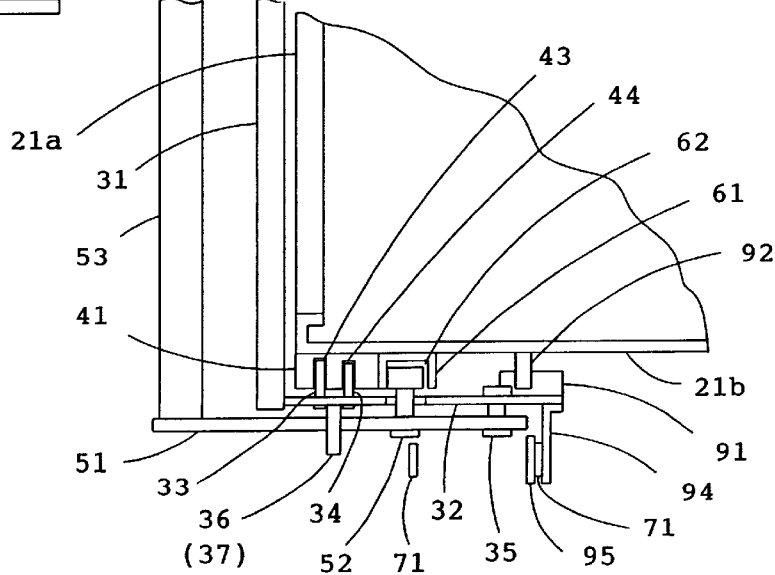
FIG. 4 is a cross sectional drawing partially illustrating the work tank of FIG. 1, viewed along line A—A in FIG. 3.

As best seen in FIG. 4, one end of each cam follower 52 is fixed to the handle lever 51, and the other end is loosely fitted into the groove 62. A roller is preferably provided on the other end of the cam follower 52, so that the cam follower 52 can slide smoothly on the side surface of the groove 62. The difference between the width of the groove 62 and the diameter of the roller is much smaller than the length of the horizontal part of the guide grooves 43 and 44. Accordingly, when the front door 31 is moved horizontally, horizontal movement of the cam follower 52 is restricted. Cut away slots 38 through which the cam followers 52 pass are formed in the brackets 32.

Timing belts 71 are provided for synchronizing movement of the brackets 32 provided on both sides of the work tank 20. The timing belts 71 engage with upper and lower pulleys 72 and 73. The upper pulleys 72 are attached to respective pulley shafts 74 via bearings 73. The pulley shafts 74 are fixed to the tank wall 21 close to upper ends of the rail blocks 61. The lower pulleys 73 are attached to both ends of a pulley shaft 75 extending along the front wall 21*a*, and rotate in synchronism. The pulley shaft 75 is rotatably supported by bearings 77 contained in housings 78. The housings 78 are attached to the tank wall 21 close to upper ends of the rail blocks 61. The timing belts 71 are linked to the brackets 32 by link members 94 and press members 95. Since the two brackets 32 thus move in synchronism, the guide pins 33 and 34 will not get stuck in the guide grooves 43 and 44.

Torsion coil springs 81 are wound around the pulley shaft 75. In order to generate a force acting to reduce the weight of the front door 31 on the timing belts 71, one end of the torsion coil springs 81 may be fixed to the pulley shaft 75 using metal fittings 82. Additionally, the force required to operate the front door 31 is reduced by the torsion coil springs 81. In order to provide a predetermined force and to move the brackets 32 in synchronism, a chain or a wire may be used in lieu of the timing belt 71.

The opening and closing of the front door 31, and a locking operation, will now be described.

FIG. 3 and FIG. 4 show the front door 31 being open at the lower limit position. At this time, the handle levers 51 come into contact with the upper stopper pins 36, and the brackets 32 come into contact with the end stoppers 49. In order to close the front door 31, the operator grips the handle 53 and lifts the handle 53 upwards. FIG. 5 shows the front door 31 lifted up to the upper limit position. Next, the operator pushes the handle 53 so as to cause the guide pins 33 and 34 to move along the horizontal part of guide grooves 43 and 44. Thereafter, the handle 53 is pushed down. As shown in FIG. 6, the handle levers 51 rotate in a counter-clockwise direction and come into contact with the lower stopper pins 37. The time required to move the front door 31 from the lower limit position to the upper limit position and then move from an unlock position to a lock position is about 2 or 3 seconds. In this way, the closing and locking operation of the front door 31 is carried out continuously in a short time with operation of a single handle. Since the movement from the position shown in FIG. 5 to the position shown in FIG. 6 is horizontal, there is an advantage that the packing attached to the front door 31 is unlikely to be damaged.

Figure 7:
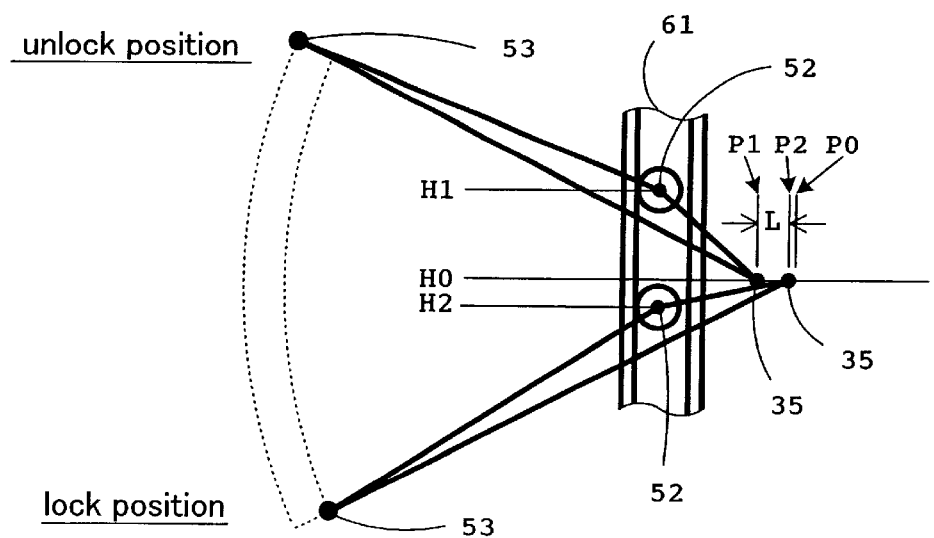
FIG. 7 is a drawing showing an operation of locking the front door of the work tank of FIG. 1.

FIG. 7 schematically shows the respective positions of the handle 53, cam followers 52 and fulcrum pins 35 when the front door 31 is moved between the unlock position and the lock position. The cam followers 52 only move in the vertical direction because of the rail block 61. When the front door 31 is in the unlock position, the cam followers 52 are positioned at a point H1 higher than the fulcrum pins 35. At this time the fulcrum pins 35 are positioned at point P1 in the horizontal direction. If the operator pushes the handle 53 down, the cam followers 52 move downwards and the fulcrum pins 35 move horizontally backwards. When the cam followers 52 are positioned at the point H0 and the cam followers 52 and the fulcrum pins 35 are arranged horizontally level with each other, the fulcrum pins 35 are positioned at point P0 which is as far to the rear as they can go. At this time an elastic force of the packing pushing the front door 31 forwards is at a maximum. If the operator pushes the handle 53 further down, and the cam followers 52 are positioned at point H2, lower than point H0, the fulcrum pins 35 are positioned at point P2. At this time, the front door 31 is positioned backwards from the unlock position by a distance L between the point P1 and the point P2. As the point P2 is positioned further forward than the point P0, the cam followers 52 do not return naturally from point P2 to point P0. If the operator pulls the handle 53 forwards and up and the handle levers 51 come into contact with the guide pins 36, the front door 31 is unlocked. Following the unlocking operation, if the operator lowers the front door 31 from the upper limit position to the lower limit position, the front door 31 is opened. In this way, according to the present invention, the opening and unlocking operations of the front door 31 are carried out continuously by simply operating the handle 53.

The illustrated embodiment has been selected simply to describe the gist and practical application of the present invention. The scope of the present invention is defined by the appended claims.

What is claimed is:

1. A work tank for an electric discharge machine for providing dielectric fluid between a workpiece and a tool electrode, comprising:

a work tank for surrounding the workpiece, said work tank including a tank wall having an opening on a front side thereof;

a front door movable in a generally horizontal direction between an unlock position where the front door is vertically movable, and a lock position where the opening is closed in a generally liquid-tight relationship;

a pair of brackets, each attached to a respective side of the front door, and extending rearwardly thereof;

a pair of fulcrums, each attached to a respective bracket;

a pair of handle levers, each supported on a respective bracket so as to pivot about the respective fulcrum;

a handle for connecting respective tips of the handle levers;

a cam follower, fixed to the handle lever forward of the fulcrum, and vertically movable between a first position higher than the fulcrum, and a second position lower down than the fulcrum; and a movement restricting member for restricting horizontal movement of the cam follower.

2. A work tank for an electric discharge machine for providing dielectric fluid between a workpiece and a tool electrode, comprising:

a work tank for surrounding the workpiece, said work tank including a tank wall having an opening on a front side thereof;

a front door movable in a generally horizontal direction between an unlock position where the front door is vertically movable, and a lock position where the opening is closed in a generally liquid-tight relationship;

a pair of brackets, each attached to a respective side of the front door, and extending rearwardly thereof;

a fulcrum, and a handle lever supported on at least one of the pair of brackets so as to pivot about the fulcrum;

a cam follower, fixed to the handle lever forward of the fulcrum, and vertically movable between a first position higher than the fulcrum, and a second position lower down than the fulcrum; and a movement restricting member for restricting horizontal movement of the cam follower.

3. The work tank of an electric discharge machine according to claim 2, wherein the movement restricting member includes a rail block having a generally vertically extending for loosely fitting the cam follower.

4. The work tank of an electric discharge machine according to claim 3, wherein the rail block is attached to the tank wall.

5. The work tank of an electric discharge machine according to claim 2, further comprising a guide block, said guide block having a guide groove extending generally vertically and then extending generally horizontally rearward from an upper end thereof, and a guide pin provided on the bracket so as to be fitted into the guide groove.

6. The work tank of an electric discharge machine according to claim 5, wherein the guide block is attached to the tank wall.

7. The work tank of an electric discharge machine according to claim 2, further comprising stopper pins, said stopper pins being provided on the bracket so as to come into contact with the handle lever for restricting the pivot angle of the handle lever.

8. The work tank of an electric discharge machine according to claim 2, further comprising a packing attached to at least one of the tank wall and the front door for preventing leakage of dielectric fluid between the tank wall and the front door.

9. The work tank of an electric discharge machine according to claim 2, further comprising a pair of timing members respectively connected to the pair of brackets for synchronizing movement of the pair of brackets.

10. The work tank of an electric discharge machine according to claim 2, further comprising a pulley shaft, and lower pulleys fixed to the ends of the pulley shaft for respectively engaging with the pair of timing members, and upper pulleys fixed to the tank wall.

11. The work tank of an electric discharge machine according to claim 10, further comprising coil springs, said coil springs having one end fixed to the pulley shaft for generating a force for reducing the weight of the front door the respective timing members.

12. The work tank of an electric discharge machine according to claim 9, further comprising force generating means for generating a force for reducing the weight of the front door an the timing members.

* * * * *